United States Patent
Hudock et al.

(10) Patent No.: US 12,393,775 B2
(45) Date of Patent: Aug. 19, 2025

(54) AUTOMATIC DATA EXTRACTION

(71) Applicant: Altair Engineering, Inc., Troy, MI (US)

(72) Inventors: Samuel Allen Hudock, Greensboro, NC (US); Maashes User Phillips, Greensboro, NC (US); Austin Alexander Spears, Greensboro, NC (US)

(73) Assignee: Altair Engineering, Inc., Troy, MI (US)

( * ) Notice: Subject to any disclaimer, the term of this patent is extended or adjusted under 35 U.S.C. 154(b) by 391 days.

(21) Appl. No.: 18/009,592

(22) PCT Filed: Jun. 11, 2021

(86) PCT No.: PCT/US2021/037115
§ 371 (c)(1),
(2) Date: Dec. 9, 2022

(87) PCT Pub. No.: WO2021/252972
PCT Pub. Date: Dec. 16, 2021

(65) Prior Publication Data
US 2023/0214586 A1     Jul. 6, 2023

Related U.S. Application Data

(60) Provisional application No. 63/038,240, filed on Jun. 12, 2020.

(51) Int. Cl.
*G06F 40/18* (2020.01)
*G06F 40/186* (2020.01)

(52) U.S. Cl.
CPC ............ *G06F 40/18* (2020.01); *G06F 40/186* (2020.01)

(58) Field of Classification Search
CPC ............................. G06F 40/18; G06F 40/186
See application file for complete search history.

(56) References Cited

U.S. PATENT DOCUMENTS

| | | | |
|---|---|---|---|
| 7,480,675 B2 * | 1/2009 | Folting | .................. G06F 40/18 707/999.102 |
| 8,005,873 B2 * | 8/2011 | Folting | .................. G06F 16/20 707/769 |

(Continued)

OTHER PUBLICATIONS

International Preliminary Report on Patentability in International Appln. No. PCT/US2021/037115, mailed on Dec. 22, 2022, 9 pages.

(Continued)

*Primary Examiner* — Barbara M Level
(74) *Attorney, Agent, or Firm* — Fish & Richardson P.C.

(57) ABSTRACT

Described are methods for automatically extracting data from structured documents e.g. spreadsheets, regardless of the manner in which data is organized, and using the extracted data to generate an output table that is in a standardized format. The method can include the operations for automatically extracting data from a spreadsheet that defines rows and columns and includes a plurality of cells that are delineated by the rows and the columns, by identifying characteristics of data included in each cell of the column, determining a template type of the column based on the characteristics of the data in each selected cell of the column, and determining, from among a plurality of cells of the column and based on characteristics of the data included in the plurality of cells of the column, a representative cell that is representative of the determined template type of the column.

16 Claims, 9 Drawing Sheets

(56) References Cited

U.S. PATENT DOCUMENTS

| | | | | |
|---|---|---|---|---|
| 8,095,866 B2* | 1/2012 | Folting | ............... | G06F 3/0482 |
| | | | | 715/212 |
| 8,312,366 B2* | 11/2012 | Folting | ............... | G06F 40/18 |
| | | | | 715/212 |
| 8,812,947 B1* | 8/2014 | Maoz | ............... | G06F 40/18 |
| | | | | 715/215 |
| 8,990,675 B2* | 3/2015 | Folting | ............... | G06F 40/18 |
| | | | | 715/212 |
| 9,069,748 B2* | 6/2015 | Folting | ............... | G06F 16/2465 |
| 9,383,913 B2* | 7/2016 | Hoyer | ............... | G06F 3/0488 |
| 9,529,789 B2* | 12/2016 | Folting | ............... | G06F 40/177 |
| 10,067,928 B1* | 9/2018 | Krappe | ............... | G06F 40/18 |
| 10,235,437 B2* | 3/2019 | Diwan | ............... | G06F 16/254 |
| 10,599,627 B2* | 3/2020 | Singh | ............... | G06F 16/25 |
| 11,782,928 B2* | 10/2023 | Chan | ............... | G06F 40/177 |
| | | | | 707/769 |
| 11,836,445 B2* | 12/2023 | Dong | ............... | G06F 40/30 |
| 11,977,533 B2* | 5/2024 | Thompson | ............... | G06V 30/412 |
| 12,038,982 B2* | 7/2024 | Zhang | ............... | G06F 16/2282 |
| 12,141,169 B1* | 11/2024 | Nelmes | ............... | G06F 40/30 |
| 12,282,855 B2* | 4/2025 | Dong | ............... | G06V 30/412 |
| 2002/0143780 A1 | 10/2002 | Gorman | | |
| 2006/0224568 A1 | 10/2006 | Debrito | | |
| 2007/0050322 A1 | 3/2007 | Vigesaa et al. | | |
| 2007/0061369 A1 | 3/2007 | Foiling et al. | | |
| 2009/0132560 A1 | 5/2009 | Vignet | | |
| 2012/0303645 A1* | 11/2012 | Kulkarni-Puranik | ... | G06F 40/18 |
| | | | | 707/756 |
| 2015/0095312 A1* | 4/2015 | Gulwani | ............... | G06F 16/284 |
| | | | | 707/722 |
| 2019/0102620 A1* | 4/2019 | Siddiq | ............... | G06F 16/24575 |
| 2020/0097541 A1* | 3/2020 | Christianson | ....... | G06F 16/3323 |
| 2021/0149919 A1* | 5/2021 | Nelmes | ............... | G06F 40/30 |
| 2021/0149920 A1* | 5/2021 | Nelmes | ............... | G06N 5/04 |

OTHER PUBLICATIONS

International Search Report in International Appln. No. PCT/US2021/037115, mailed on Sep. 23, 2021, 11 pages.

* cited by examiner

FIG. 8

AUTOMATIC DATA EXTRACTION

CROSS REFERENCE TO RELATED APPLICATION

This application is a National Stage Application under 35 U.S.C. § 371 of International Application No. PCT/US2021/037115, filed on Jun. 11, 2021, which claims the benefit of U.S. Application Ser. No. 63/038,240, filed on Jun. 12, 2020, the entire contents of which are incorporated by reference in their entirety.

TECHNICAL FIELD

This specification generally relates to automatically extracting data stored in digital files e.g., spreadsheets.

BACKGROUND

A spreadsheet (also referred to as a worksheet) is a type of an electronic document that has defined rows and columns making up a grid, in which data can be input and stored.

Data in a spreadsheet can be organized in numerous ways. As one example, data in a spreadsheet can be organized in a single table-format (also referred to as a one-dimensional table). In this example, the data in the table can be organized such that the first row of the table specifies headings for a set of columns and each subsequent row of the table includes data entries for the respective columns. As another example, data in a spreadsheet can be organized in a two-dimensional table-format. In this example, the data in the table can be organized such that the first row of the table specifies headings for a set of columns and the first column of the table specifies headings for a set of rows, and each row of the resulting table includes data entries for each of the respective rows and columns. As another example, data in the spreadsheet can be organized using multiple smaller tables or groupings of data, in which one or more of the tables are related (e.g., one or more tables may be part of one or more larger tables). As will be appreciated, there can be many additional ways in which data can be stored/organized in a spreadsheet.

As a result, conventional spreadsheet data analysis tools that generally function on a contiguous set of data (e.g., data organized in a contiguous set of rows and columns of the spreadsheet) cannot be readily used to analyze data in these columns—without restructuring and/or reformatting the data in the spreadsheet.

SUMMARY

This specification (and the accompanying appendices) generally relate to automatically extracting data from a spreadsheet, regardless of the manner in which data is organized in the spreadsheet, and using the extracted data to generate an output table that is in a standardized format (e.g., a one-dimensional table, a two-dimensional table, etc.).

In one aspect, a method can include the operations for automatically extracting data from a spreadsheet that defines rows and columns and includes a plurality of cells that are delineated by the rows and the columns, the operations can include: obtaining the spreadsheet, wherein the spreadsheet includes data that is stored in a set of rows and a set of columns of the spreadsheet; receiving a contiguous selection of cells of the spreadsheet, wherein the contiguous selection of cells spans a first set of rows and a first set of columns, and wherein the first set of rows is a subset of the set of rows and the first set of columns is a subset of the set of columns; for each column in the first set of columns: identifying characteristics of data included in each cell of the column; determining a template type of the column based on the characteristics of the data in each selected cell of the column, wherein the template type includes a categorical template or a detailed record template, and wherein (1) a categorical template specifies that data stored in the column includes categorical data that is associated with a plurality of rows of data in an extracted dataset or (2) a detailed record template specifies that data stored in the column includes detailed data that is associated with a single row of data in the extracted dataset; and determining, from among a plurality of cells of the column and based on characteristics of the data included in the plurality of cells of the column, a representative cell that is representative of the determined template type of the column; selecting, from among the first set of columns, a second set of columns that includes each column that is determined to be categorical template columns and a third set of columns that includes one or more columns that are determined to be detailed record template columns; identifying, based on the representative cells in each of the first set of columns, a single row in the contiguous selection, wherein each of a plurality of cells in the single row includes data in a format and a structure that is representative of a format and a structure of data stored in a corresponding column for the cell; generating, for each column in the third set of columns corresponding to the single row, a set of rules that define data extraction locations in the column; generated, based on the single row, the second set of columns, the third set of columns, and the set of rules for each of the third set of columns, an extracted dataset; and providing the extracted dataset for display on a computing device. Other embodiments of this aspect include corresponding methods, apparatus, and computer programs, configured to perform the actions of the methods, encoded on computer storage devices. These and other embodiments can each optionally include one or more of the following features.

In some implementations, identifying the third set of columns that includes one or more columns that are determined to be detailed record template columns, can include: determining a candidacy fitness score for each column in the first set of columns, wherein the candidacy fitness score for a particular column specifies a likelihood of the particular column being suitable for data extraction; and identifying, from among the first set of columns, the one or more columns based on the candidacy fitness score for each of the one or more columns being higher relative to the candidacy fitness score for each of a remaining number of columns in the first set of columns.

In some implementations, the candidacy fitness score for each column in the first set of columns can be determined based on: whether the column includes numeric data, text data, or data identifying dates; and whether the column is sparsely populated, wherein a column is sparsely populated if a threshold number of cells of the column are blank.

In some implementations, the characteristics of data in each selected cell of the column can include one or more of: a type of the data that specifies whether the data is a text, a number, a currency, or a date; border characteristics of the cell including the data; color or shading characteristics of the cell including the data; font characteristics of the data; and alignment characteristics of the data within the cell.

In some implementations, determining a representative cell that is representative of the determined template type of the column, can include: for each of the plurality of cells in the column: computing a score for a set of metrics, including a largest like metric, a smallest like metric, a smallest like background metric, a largest like data type, and a content length metric; determining a weighted score for each metric in the set of metrics by combining a weight assigned to the metric with the computed score for the metric; and combining the weighted score each metric to obtain a combined weighted score for the cell; and determining that the combined weighted score for the representative cell exceeds the combined weighted score for each of a remaining cells in the plurality of cells.

The techniques described in this specification (and the accompanying appendices) can be implemented in particular embodiments to realize the following advantages. Specifically, the techniques described in this specification can automatically (e.g., without any user input or with very limited user input, such as a user's selection of a portion of the spreadsheet) infer the structure and organization of a spreadsheet and extract data from the spreadsheet.

BRIEF DESCRIPTION OF THE DRAWINGS

FIG. 8 is a schematic diagram of an example user interface.

Like reference numbers and designations in the various drawings indicate like elements.

DETAILED DESCRIPTION

Described herein are systems and methods for automatic data extraction from documents, e.g., spreadsheets. Some conventional solutions attempt to extract data from documents. However, such solutions are generally able to extract data only when data is organized/structure in certain known ways. In other words, such solutions are generally unable to handle new ways in which data may be structured or organized. This in turn results in poor data extraction and/or requires additional functionality/development to try to extract data using the new data organization/structure. As a result, such conventional solutions can be resource intensive, may require constant updating, and yet may not accurately or consistently extract data from a spreadsheet. In contrast, the techniques described in this specification are agnostic to the structure and organization of the data in a document and can efficiently and consistently extract data from spreadsheets regardless of the structure/organization of data in these documents. While in the examples used herein the documents are generally spreadsheets, it will be recognized that the same techniques can be applied to other types of documents, e.g., PDF documents etc.

Figure 1:
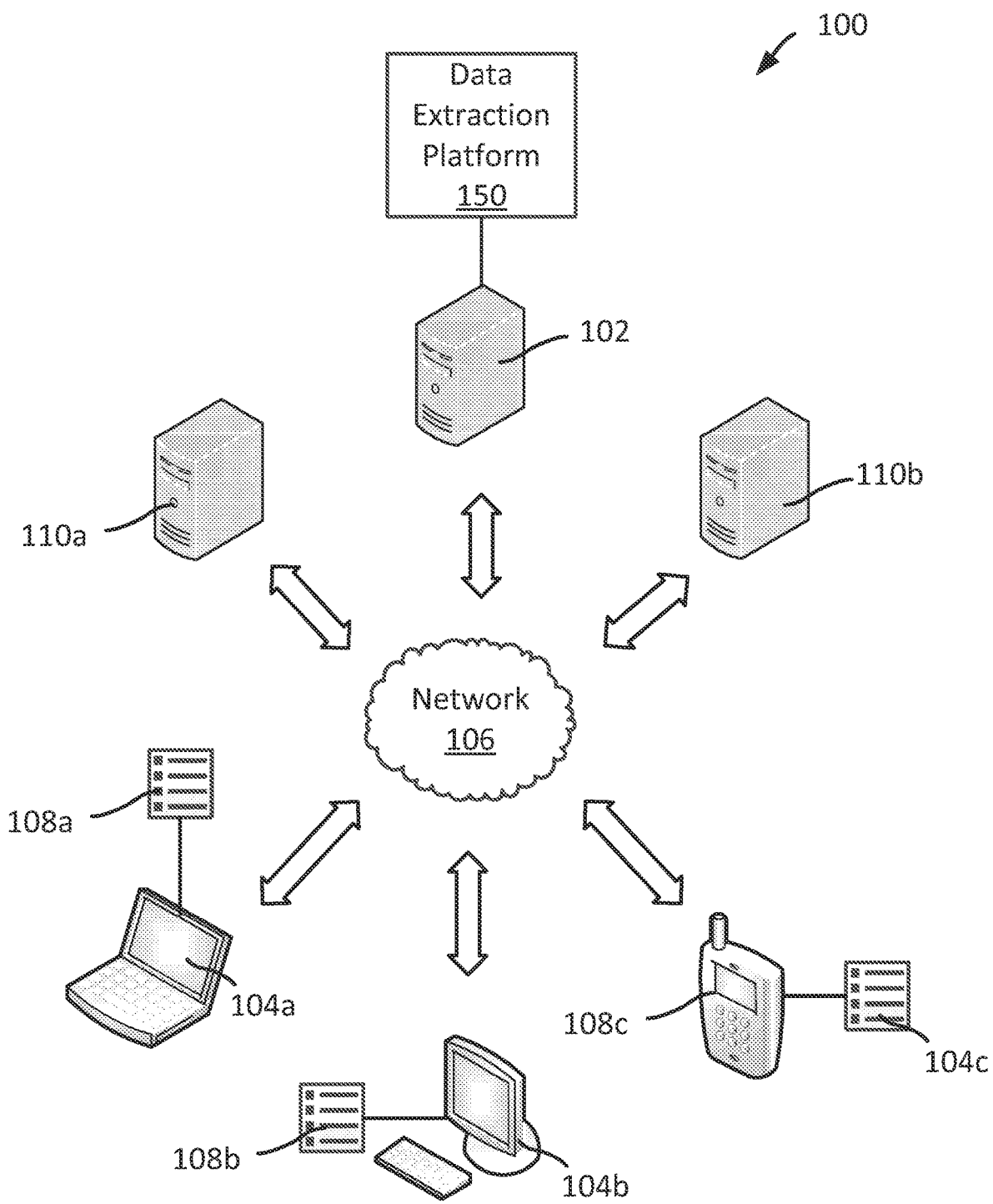
FIG. 1 is a diagram of an example system for automatic data extraction.

An example system 100 for data extraction is shown in FIG. 1. The system 100 includes a data extraction platform 150 maintained on a server computer system 102 that includes one or more server computers.

The server computer system 102 is illustrated as a respective single component. However, in practice, it can be implemented on one or more computing devices (e.g., each computing device including at least one processor such as a microprocessor or microcontroller). A server computer system 102 can be, for instance, a single computing device that is connected to the network 106, and the data extraction platform 150 can be maintained and operated on the single computing device. In some implementations, the server computer system 102 can include multiple computing devices that are connected to the network 106, and the data extraction platform 150 can be maintained and operated on some or all of the computing devices. For instance, the server computer system 102 can include several computing devices, and the data extraction platform 150 can be distributive on one or more of these computing devices. In some implementations, the server computer system 102 need not be located locally to the rest of the system 100, and portions of a server computer system 102 can be located in one or more remote physical locations.

The server computer system 102 is communicatively connected to client computer systems 104a-c using the network 106. Each client computer system 104a-c includes a respective user interface 108a-c. Users interact with the user interfaces 108a-c to view data (e.g., data on the server computer system 102 and the platform 150, and/or data on other the client computer systems 104a-c). Users also interact with the user interfaces 108a-c to transmit data to other devices (e.g., to the server computer system 102 and the platform 150, and/or to the other client computer systems 104a-c). Users interact with the user interfaces 108a-c to issue commands (e.g., to the server computer system 102 and the platform 150, and/or to the other client computer systems 104a-c). Commands can be, for example, any user instruction to the server computer system 102 and/or to the other client computer systems 104a-c. In some implementations, a user can install a software application onto a client computer system 104a-c in order to facilitate performance of these tasks. For example, data extraction platform 150 can be installed on a client computer system 104a-c as a stand-alone platform that does not require a connection to the server computer system 102.

A client computer system 104a-c can be any electronic device that is used by a user to view, process, transmit and receive data. Examples of the client computer systems 104a-c include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 106. The client computer systems 104a-c can include devices that operate using one or more operating system (e.g., Microsoft Windows, Apple OS X, Linux, Unix, Android, Apple iOS, etc.) and/or architectures (e.g., x86, PowerPC, ARM, etc.) In some implementations, one or more of the client computer systems 104a-c need not be located locally with respect to the rest of the system 100, and one or more of the client computer systems 104a-c can be located in one or more remote physical locations.

The server computer system 102 is also communicatively connected to data extraction computer systems 110a and 110b using the network 106. The data extraction computer systems 110*a* and 110*b* store electronic content items (e.g., one or more data files, images, audio files, video files, computerized models, text files, spreadsheets, and/or other electronic content). Each data extraction computer system 110*a* and 110*b* is illustrated as a respective single component. However, in practice, a data extraction computer system 110*a* or 110*b* can be implemented on one or more computing devices (e.g., each computing device including at least one processor such as a microprocessor or microcontroller). A data extraction computer system 110*a* or 110*b* can be, for instance, a single computing device that is connected to the network 106. In some implementations, a data extraction computer system 110*a* or 110*b* can include multiple computing devices that are connected to the network 106. In some implementations, the data extraction computer system 110*a* and 110*b* need not be located locally to the rest of the system 100, and portions of the data extraction computer system 110*a* and 110*b* can be located in one or more remote physical locations.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

In some embodiments, as described above with reference to client devices 1-4*a-c*, the data extraction platform may be executed on a stand-alone workstation. The workstation may, or may not be connected to a network.

Figure 2:
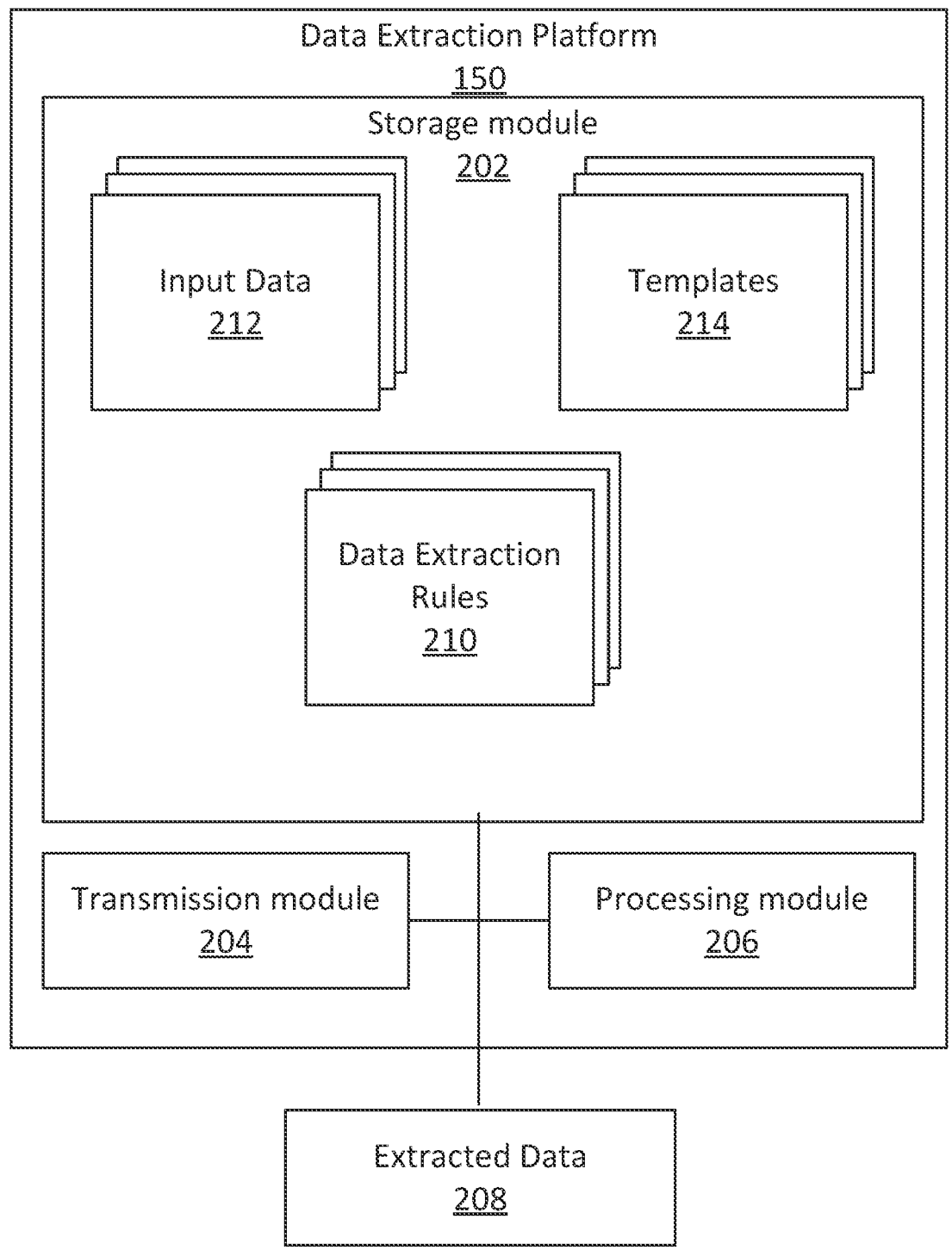
FIG. 2 is a diagram of an example automatic data extraction platform.

FIG. 2 shows various aspects of the data extraction platform 150. The data extraction platform 150 includes several modules that perform particular functions related to the operation of the system 100. For example, the data extraction platform 150 can include a storage module 202, a transmission module 204, and a processing module 206. The output of the data extraction platform 150 can be extracted data 208, which is a subset of the input data 212.

The storage module 202 can store input data 212 as one or more data files, text files, and/or other electronic content. In some cases, at least some of the electronic content items stored by the storage module 202 are obtained from the data extraction computer systems 110*a* and/or 110*b*. Further, the storage module 202 can store information describing the electronic content items. Input data 212 can be one or more files from which data is to be extracted, for example a spreadsheet in which data is input/organized in multiple tables. For example, the spreadsheet can be a shipping report that includes multiple tables, with each table storing data regarding a particular purchase order for a particular customer. While the spacing and separation of the different tables within the spreadsheet can visually aid a viewer discern the data about each purchase order in the spreadsheet, this separation and spacing between the different tables can make data analysis of the entire dataset challenging.

The storage module can further store data extraction rules 210, e.g., rules indicating a location of data to be extracted.

The storage module can store one or more templates 214 for data extraction. The template 214 can be selected based on the characteristics of the data in the input data 212. For example, for a column of a spreadsheet from which data is to be extracted, in each selected cell of the column, template types can include a categorical template or a detailed record template. A categorical template specifies that data stored in the column includes categorical data that is associated with a plurality of rows of data in an extracted dataset. A detailed record template specifies that data stored in the column includes detailed data that is associated with a single row of data in the extracted database.

The transmission module 204 allows for the transmission of data to and from the data extraction platform 150. For example, the transmission module 204 can be communicatively connected to the network 106, such that it can transmit data to the client computer systems 104*a-c*, and receive data from the client computer systems 104*a-c* via the network 106. As an example, information inputted by users on the client computer systems 104*a-c* can be transmitted to the data extraction platform 150 through the transmission module 204. This information can then be processed (e.g., using the processing module 206) and/or stored (e.g., using the storage module 202). As another example, information from the data extraction platform 150 (e.g., information stored on the storage module 202) can be transmitted to the client computer systems 104*a-c* through transmission module 204.

The processing module 206 processes data stored or otherwise accessible to the data extraction platform 150. For instance, the processing module 206 can execute automated or user-initiated processes that extract data pertaining to one or more input items 212. As an example, the processing module 206 can deploy templates 214 and data extraction rules 210 to extract data from input data 212. Further, the processing module 206 can process data that is received from the transmission module 204 or stored at the storage module 202. Likewise, processed data from the processing module 206 can be stored on the storage module 202 and/or sent to the transmission module 204 for transmission to other devices. Example processes that can be performed by the processing module 206 are described in greater detail below.

As described above, one or more implementations of the data extraction platform 150 enables a user to extract data 208 from input data 212. The extracted data 208 can be provided as a separate spreadsheet (e.g., within a separate spreadsheet document or within a separate sheet of the received spreadsheet document). In some implementations, the extracted data can be provided as an input to another system (e.g., an enterprise resource planning (ERP) system, an analytics system, etc.), which in turn can perform further processing on this output data. Examples of this functionality is illustrated in FIGS. 3-8.

Figure 3:
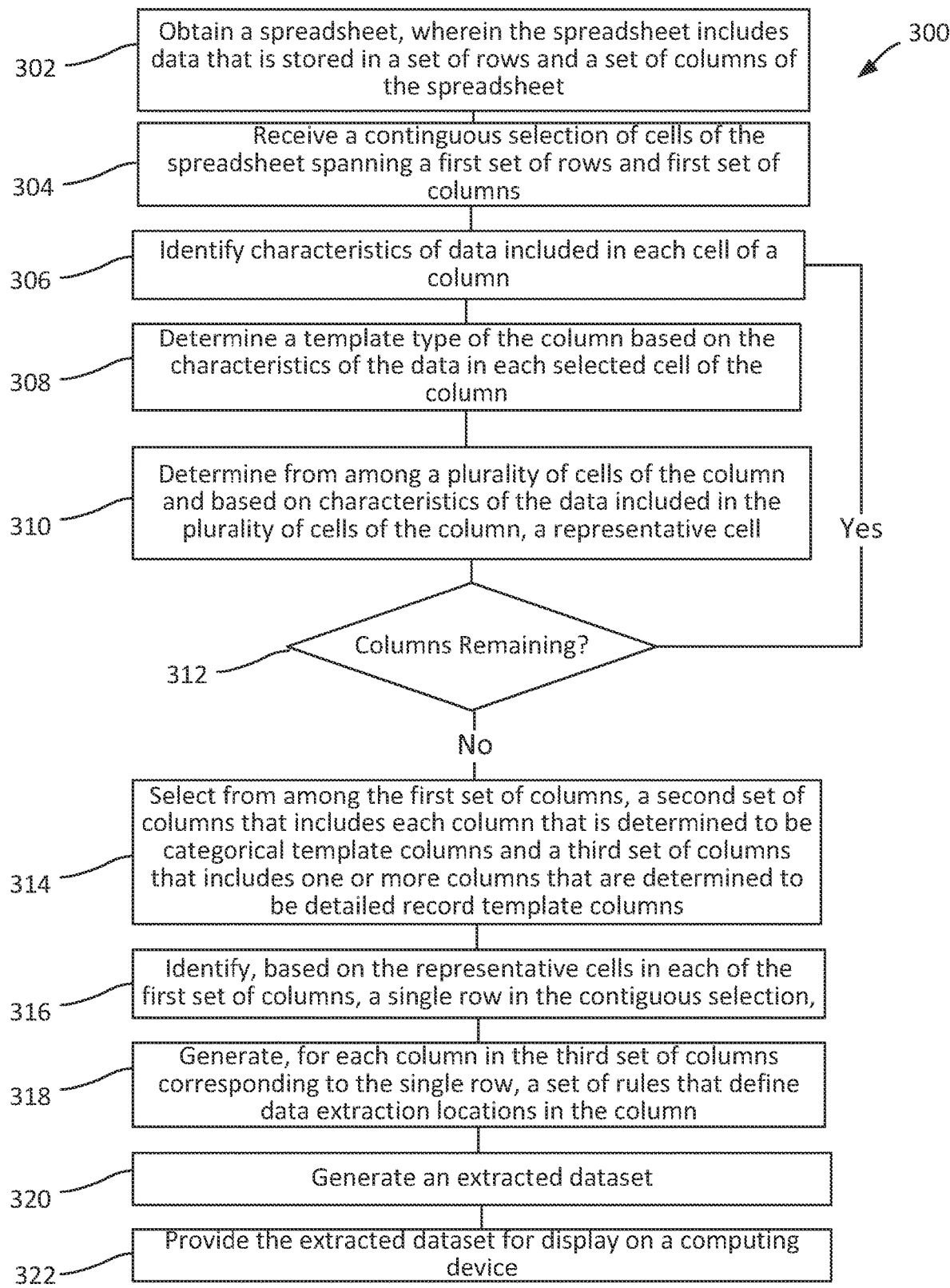
FIG. 3 is a flow diagram of an example method of data extraction.

FIG. 3 is a flow diagram of an example method of data extraction. In an example a platform for data extraction e.g., platform 150 can obtain 302 a spreadsheet that defines rows and columns and includes plurality of cells that are delineated by the rows and the columns.

The platform receives 304 a contiguous selection of cells of the spreadsheet, wherein the contiguous selection of cells spans a first set of rows and a first set of columns, and wherein the first set of rows is a subset of the set of rows and the first set of columns is a subset of the set of columns. The can be received via user input, for example by selecting, highlighting or otherwise inputting via a user interface a selection of cells.

For each column in the first set of column, the platform identifies 306 characteristics of data included in each cell of the column. For example, the data extraction platform may analyze one or more aspects of the data in each cell to determine if, for instance, the data is text data, numeric data, time/data etc. If the data is text data, the data extraction platform may determine a type of the data that specifies whether the data is a text, a number, a currency, or a date, border characteristics of the cell including the data, color or shading characteristics of the cell including the data, font characteristics of the data, alignment characteristics of the data within the cell, etc.

The platform further determines 308 a template type of the column based on the characteristics of the data in each selected cell of the column. One example template type includes a categorical template. Categorical templates specify that data stored in the column includes categorical data that is associated with a plurality of rows of data in an extracted dataset. For example, an append template defines a shape or pattern whose matches correspond to categorical data that applies to one or more records. Another example of a template is a detailed record template. Detailed record templates specify that data stored in the column includes detailed data that is associated with a single row of data in the extracted dataset. For example, the detail template can define a shape or pattern whose matches correspond one-to-one with a single row of tabular data in the extracted table. A further type of template is an append template.

The template type of the column is determined 308 by constructing a column template evaluation node network (described with reference to FIG. 4 below). An evaluation node is a single logical unit that accepts an input container (a data structure containing all references and data required for formula evaluation within each node of a node network.) and a statistics aggregator. The node evaluates a formula based on its input and submits its evaluation score with a corresponding categorization type and type weight to the statistics aggregator. Evaluation then proceeds to one or more referenced evaluation nodes or terminates the evaluation process based upon how the evaluation score relates to a pass threshold, e.g., a decimal value between 0.0 and 1.0 that represents the minimum evaluation score to categorize a formula result e.g., meets, exceeds the pass threshold of the evaluation score. The evaluation node network is a collection of evaluation node logical units that has a defined starting node. Given its defined input, a statistics aggregator is compiled with each evaluation node's result and is returned as the output of the network. The network itself contains the predefined node structure that all input passes through.

For example, the column template evaluation node network may use a statistical aggregator, where a statistical aggregator is container for all categorization types that are being evaluated. Each entry contains a categorization type paired with a weighted average that can be updated by providing an evaluation score and a type weight. The statistical aggregator outputs the categorization type with the highest weighted average. The categorization type is a singular entry in a given set of uniquely identifiable members. If two or more categorization types are tied for the highest weighted average, the categorization type with the highest type weight is chosen. Where the type weight is an integer value between 1 and 10 that represents how heavily an evaluation score should affect a weighted average for a given categorization type. One is considered the lowest or lightest weight, whereas 10 is considered the highest or heaviest weight.

The platform determines 310 from among a plurality of cells of the column and based on characteristics of the data included in the plurality of cells of the column, a representative cell that is representative of the determined template type of the column. The output of the node network can be stored in an evaluation node network output container data structure that stores information related to and calculated by Node Network output. The node network output container contains a Template Type, the selection column index, the selection column's candidacy fitness evaluation score, and a row index of the cell that has been identified as the most representative of the Template Type's data within that column.

The platform determines 310 the cell that is representative of the determined template type of the column by initiating a detail column node network (described in more detail with reference to FIG. 5, and FIG. 6) or append column node network (described in more detail with reference to FIG. 7) depending on whether the template type is a detail template or a categorical template, respectively. Using the statistics aggregator returned from the detail column node network or append column node network, the platform 150 acquires the row index location of the cell associated to the highest average evaluation score and add it to the current Node Network Output Container.

Determining 310 the cell that is representative can include, for each of the plurality of cells in the column, computing a score for a set of metrics, including a largest like metric, a smallest like metric, a smallest like background metric, a largest like data type, and a content length metric. A weighted score for each metric in the set of metrics can be determined by combining a weight assigned to the metric with the computed score for the metric. A combined weighted score for the cell can be determined by combining the weighted score for each metric to obtain a combined weighted score for the cell. When the combined weighted score for a representative cell exceeds the combined weighted score for each of the remaining cells in the plurality of cells, that cell is determined to be the representative cell.

If there are any columns remaining in the selection of cells then then items 306-310 are repeated 312 for each further column.

The platform selects 314, from among the first set of columns, a second set of columns that includes each column that is determined to be categorical template columns and a third set of columns that includes one or more columns that are determined to be detailed record template columns. Further, the platform identifies 316 based on the representative cells in each of the first set of columns, a single row in the contiguous selection. Each of a plurality of cells in the single row includes data in a format and a structure that is representative of a format and a structure of data stored in a corresponding column for the cell.

In an implementation, the selecting 314 by the platform includes determining a candidacy fitness score for each column in the first set of columns. The candidacy fitness score for a particular column specifies a likelihood of the particular column being suitable for data extraction. The selecting 314 can further include identifying, from among the first set of columns, the one or more columns based on the candidacy fitness score for each of the one or more columns being higher relative to the candidacy fitness score for each of a remaining number of columns in the first set of columns. The candidacy fitness score for each column in the first set of columns can be determined based on whether the column includes numeric data, text data, or data identifying dates; and whether the column is sparsely populated. A column is sparsely populated if a threshold number of cells of the column are blank.

The platform further identifies 316, based on the representative cells in each of the first set of columns, a single row in the contiguous selection, wherein each of a plurality of cells in the single row includes data in a format and a structure that is representative of a format and a structure of data stored in a corresponding column for the cell.

For each column in the third set of columns corresponding to the single row, a set of rules can be generated 318 that define data extraction locations in the column. The rules can related to the value of a cell, the border, background, font, alignment, etc. The platform can then generate 320, based on the single row, the second set of columns, the third set of columns, and the set of rules for each of the third set of columns, an extracted dataset and provide the extracted dataset for display on a computing device.

The data extraction process described with reference to FIG. 3 can be deployed on any computing system (e.g., one or more servers or another data processing apparatuses) that can be configured to receive, as input, spreadsheets from one or more devices or storage locations (e.g., databases, third party servers, etc.). The computing system, and in particular the automatic model definition algorithm, can be configured to receive a user selection of a contiguous set of data in the received spreadsheet (e.g., selection of data stored in a contiguous set of rows and columns), and to process this selection of data, without any further user input. Based on this processing, the data extraction process can infer the structure, formatting, and organization of the data in a structured document, e.g., spreadsheet. Based on this analysis/processing, the data extraction process can extract data from the spreadsheet and generate an output table using the extracted data that is in a standardized format (e.g., a one-dimensional table, a two-dimensional table, etc.).

Figure 4:
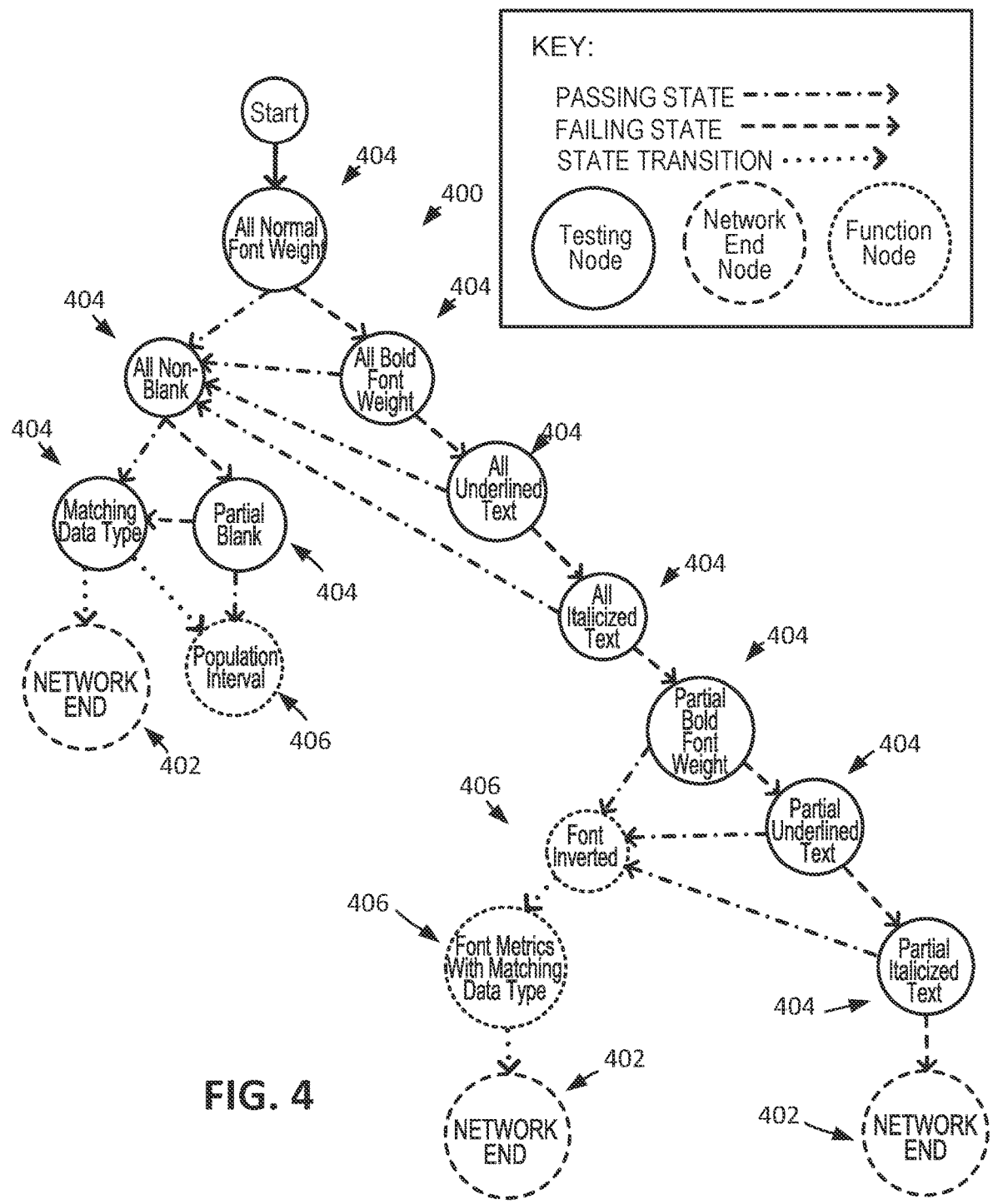
FIG. 4 is a schematic diagram of an example column template evaluation node network.

FIG. 4 is a schematic diagram of an example column template evaluation node network 400. The node network output container is data structure that stores information related to and calculated by Node Network output. The node network output container contains a Template Type, the selection column index, the selection column's candidacy fitness evaluation score, and a row index of the cell that has been identified as the most representative of the Template Type's data within that column. The column template evaluation node network 400 includes 3 types of nodes; two types of evaluation nodes (a single logical unit that accepts an input container) and network end nodes. The node evaluates a formula based on its input and submits its evaluation score with a corresponding categorization type and type weight to a statistics aggregator. Evaluation then proceeds to one or more referenced evaluation nodes or terminates the evaluation process based upon how the evaluation score relates to the pass threshold (e.g., meets, exceeds, etc.), and network end nodes 402, which terminate the network output container. The two types of evaluation nodes are testing nodes 404 which evaluate a binary pass/fail condition, and function nodes 406 which compute an evaluation score that is representative of fitness for a particular condition or application. Each node has a pass threshold, e.g., a decimal value between 0.0 and 1.0 that represents the minimum evaluation score to categorize a formula result. Depending on whether the score computed at a node is a pass (e.g., passing state) or fail (e.g., failing state) the evaluation proceeds to a further node, until a network end node 402 is reached. Some example evaluation node types used in the column template evaluation node network 400 are described in Table 1.

TABLE 1

| Node Name | Function Description |
| --- | --- |
| All Normal Font Weight | Calculates a ratio of cells between those whose text content is non-bold, non-italic, and non-underlined, versus the total number of cells in a given column expressed as an evaluation score. Pass threshold is much closer to 1 in order to indicate a majority of normal values. |
| All Bold Font Weight | Calculates a ratio of cells between those whose text font weight is bold versus the total number of non-blank cells in a given column expressed as an evaluation score. Pass threshold is much closer to 1 in order to indicate a majority of bold values. |
| All Underlined Text | Calculates a ratio of cells between those whose text font is underlined versus the total number of non-blank cells in a given column selection expressed as an evaluation score. Pass threshold is much closer to 1 in order to indicate a majority of underlined values. |
| All Italicized Text | Calculates a ratio of cells between those whose text font is italicized versus the total number of non-blank cells in a given column selection expressed as an evaluation score. Pass threshold is much closer to 1 in order to indicate a majority of italicized values. |
| Partial Bold Font Weight | Calculates a ratio of cells between those whose text font weight is bold versus the total number of non-blank cells in a given column selection expressed as an evaluation score. Pass threshold is much closer to .5 to indicate a split between bold and non-bold values. |
| Partial Underlined Text | Calculates a ratio of cells between those whose text font is underlined versus the total number of non-blank cells in a given column selection expressed as an evaluation score. Pass threshold is much closer to .5 to indicate a split between underlined and non-underlined values. |
| Partial Italicized Text | Calculates a ratio of cells between those whose text font is italicized versus the total number of non-blank cells in a given column selection expressed as an evaluation score. Pass threshold is much closer to .5 to indicate a split between italicized and non-italicized values. |
| Font Interval | Starting at the top of the given column selection, counts the occurrences of normal text cell intervals between non-normal (includes bold, italic, and underline) text cells. Standard deviation and average are calculated on the collection of interval lengths and related to express an evaluation score. |
| Font Metrics With Matching Data Type | Given a set of font metrics that occur within the column, calculates a ratio of cells between those whose cells have matching font metrics related to the most frequently occurring data type among those cells. of selection expressed as an evaluation score. Pass threshold is much closer to 1 to indicate a correlation between font metrics and template classification. |

TABLE 1-continued

| Node Name | Function Description |
|---|---|
| Population Interval | Starting at the top of the given column selection, counts the occurrences of contiguous blank cell intervals between non-blank cells. Standard deviation and average are calculated on the collection of interval lengths and related to express an evaluation score. |
| Partial Blank | Calculates a ratio of cells between those whose cell content contains no characters, only white-space characters, or no value at all versus the total number of cells in a given column expressed as an evaluation score. Pass threshold is much closer to .5 in order to indicate a majority of blank values. |
| All Non-Blank | Calculates a ratio of cells between those whose cell content contains no characters, only white-space characters, or no value at all versus the total number of cells in a given column expressed as an evaluation score. Pass threshold is much closer to 1 in order to indicate a majority of non-blank values. |
| Matching Data Type | Calculates a ratio of cells between those whose cell content matches the most frequently occurring data type versus the total number of cells in a given column selection expressed as an evaluation score. Pass threshold is much closer to 1 in order to indicate a majority of similar data type content. |

Figure 5:
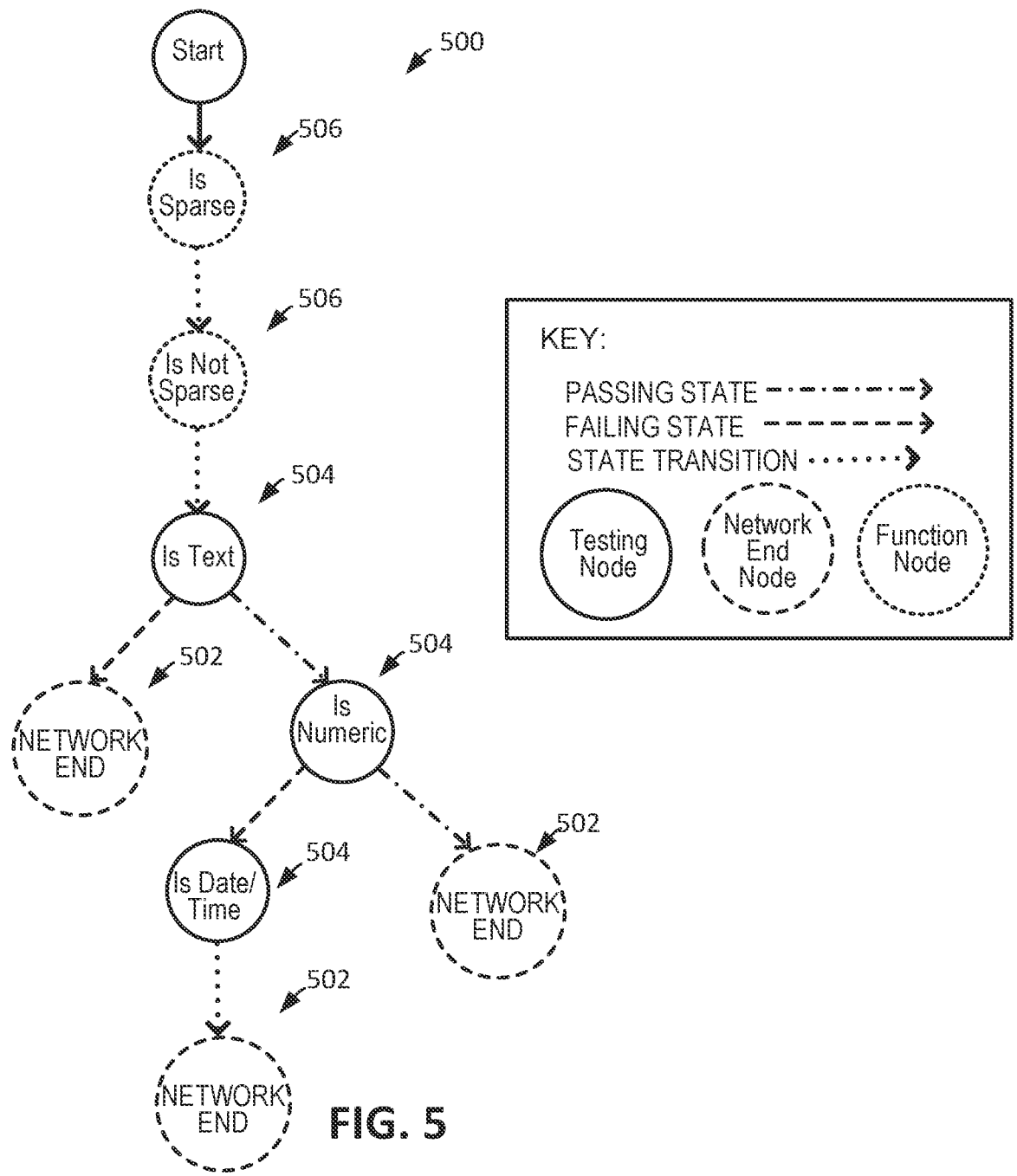
FIG. 5 is a schematic diagram of an example detail column candidacy node network.

FIG. 5 is a schematic diagram of an example detail column candidacy node network. The detail column candidacy node network 400, when given a single column within a contiguous rectangular selection on a document containing structured data e.g., a spreadsheet returns a Statistics Aggregator containing a single generic categorization type whose evaluation score weighted average represents the single column's fitness to contain a trap in the detail column template.

A trap is a worksheet (X, Y) location relative to a grouping of one or more traps, or that represents an origin point for data extraction. A trap contains a collection of rules that define data extraction locations in a single column. Traps can be combined across multiple columns or rows to produce specific record extraction locations. That is, the platform 150 acquires the row index location of the cell associated to the highest average evaluation score and associates it with a trap.

Rules can be, for example, a predicate expression evaluated on a single cell at a time in the spreadsheet. Rules have a type which determine the predicate function evaluated therein. For example, rules can related to values, borders, font, alignment, background, etc. as described above.

As described above with reference to FIG. 4 and the column template evaluation node network, the detail column candidacy node network 500 includes 3 types of nodes; two types of evaluation nodes (a single logical unit that accepts an input container) and network end nodes. The node evaluates a formula based on its input and submits its evaluation score with a corresponding categorization type and type weight to a statistics aggregator. Evaluation then proceeds to one or more referenced evaluation nodes or terminates the evaluation process based upon how the evaluation score relates to the pass threshold (e.g., meets, exceeds, etc.), and network end nodes 502, which terminate the network output container. The two types of evaluation nodes are testing nodes 504 which evaluate a binary pass/fail condition, and function nodes 506 which compute an evaluation score that is representative of fitness for a particular condition or application. Each node has a pass threshold, e.g., a decimal value between 0.0 and 1.0 that represents the minimum evaluation score to categorize a formula result. Depending on whether the score computed at a node is a pass (e.g., passing state) or fail (e.g., failing state) the evaluation proceeds to a further node, until a network end node 502 is reached. Some example evaluation node types used in the detail column evaluation node network 400 are described in Table 2.

TABLE 2

| Node Name | Function Description |
|---|---|
| Is Sparse | Calculates an evaluation score based on the number of cells in a selection that are blank versus the total number of cells in that selection. A lower evaluation score correlates to a less densely populated column and less desirable location for the construction of a Trap definition. |
| Is Not Sparse | Calculates an evaluation score based on the number of cells in a selection that are not blank versus the total number of cells in that selection. A higher evaluation score correlates to a densely populated column and more desirable location for the construction of a Trap definition. |
| Is Numeric | Calculates an evaluation score based on the number of cells in a selection whose text value is classified as numeric versus the total number of cells in that selection. Pass threshold is much closer to .75 in order to indicate a majority of numeric values. |
| Is Date/Time | Calculates an evaluation score based on the number of cells in a selection whose text value is classified as a date/time versus the total number of cells in that selection. Pass threshold is much closer to .75 in order to indicate a majority of date/time values. |
| Is Text | Calculates an evaluation score based on the number of cells in a selection whose text value is classified as non-numeric and non-date/time versus the total number of cells in that selection. Pass threshold is much closer to .75 in order to indicate a majority of non-numeric and non-date/time values. |

Figure 6:
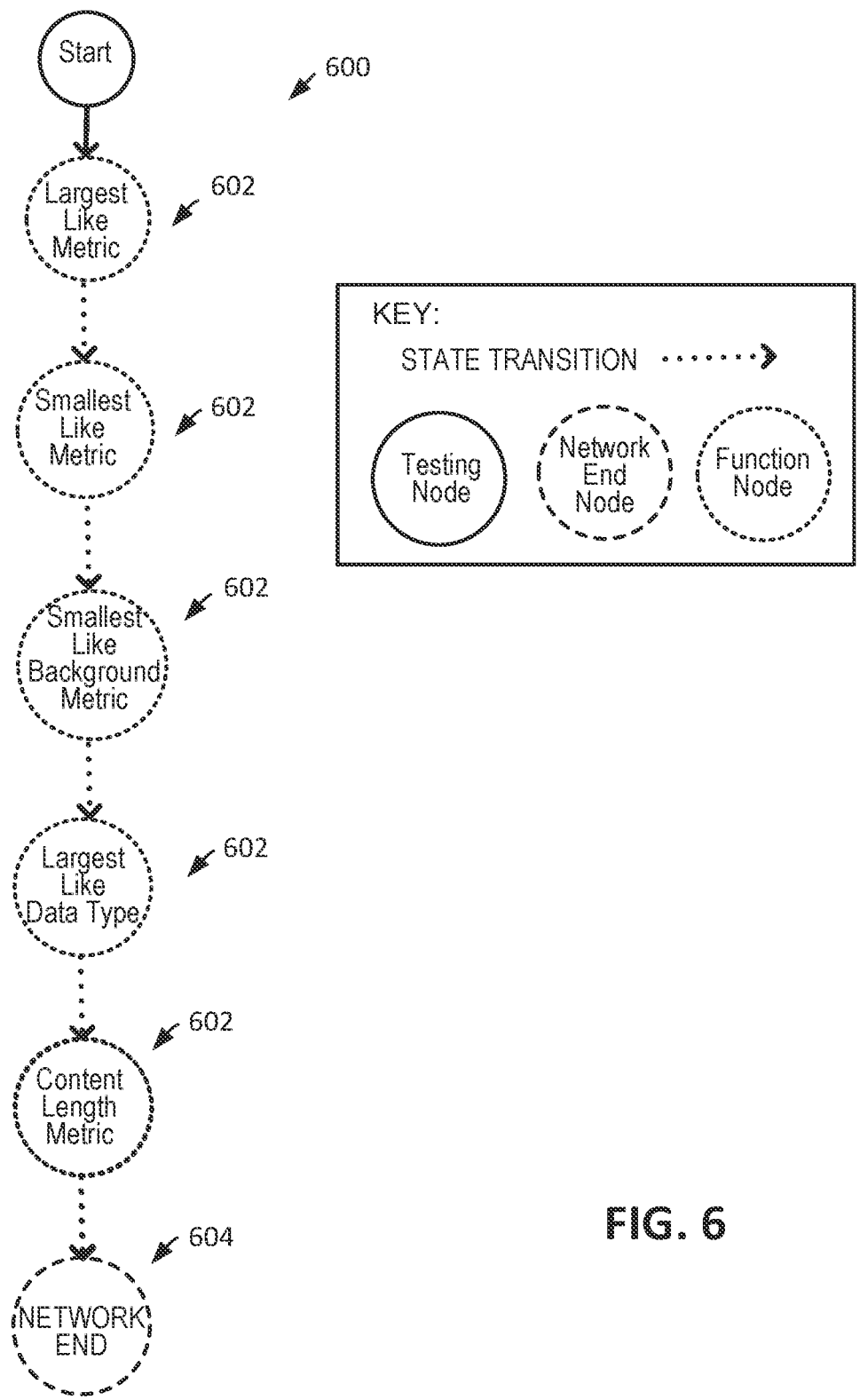
FIG. 6 is a schematic diagram of an example detail column node network.

FIG. 6 is a schematic diagram of an example detail column node network. Given a single column within a contiguous rectangular selection in a document the detail column node network, returns a Statistics Aggregator with an integer as its categorization type whose highest evaluation score represents the row index of the cell that has been identified as the most representative of the detail data within the column. The detail column node network includes function nodes 602 which (as previously described) compute an evaluation score that is representative of fitness for a particular condition or application. Each node has a pass threshold, e.g., a decimal value between 0.0 and 1.0 that represents the minimum evaluation score to categorize a formula result. The result transitions via one or more state transitions until a network end node 604 is reached. Some example evaluation node types used in the detail column node network 600 are described in Table 3.

TABLE 3

| Node Name | Function Description |
| --- | --- |
| Largest Like Metric | Calculates an evaluation score based on the number of cells in a selection that differ from the most frequently occurring set of font metrics in that selection. Dynamically weights row index integers as its categorization types with the lowest (closest to zero) receiving the highest weights. |
| Smallest Like Metric | Calculates an evaluation score based on the number of cells in a selection that differ from the least frequently occurring set of font metrics in that selection. Dynamically weights row index integers as its categorization types with the lowest (closest to zero) receiving the highest weights. |
| Smallest Like Background Metric | Calculates an evaluation score based on the number of cells in a selection that differ from the least frequently occurring cell background color in that selection. Dynamically weights row index integers as its categorization types with the lowest (closest to zero) receiving the highest weights. |
| Largest Like Data Type | Calculates an evaluation score based on the number of cells in a selection that differ from the most frequently occurring data type in that selection. Dynamically weights row index integers as its categorization types with the lowest (closest to zero) receiving the highest weights. |
| Content Length Metric | Calculates an evaluation score based on an individual cell's text content length variance from the standard deviation of all text content lengths (in characters) in a column selection. Dynamically weights row index integers as its categorization types with the lowest (closest to zero) receiving the highest weights. |

Figure 7:
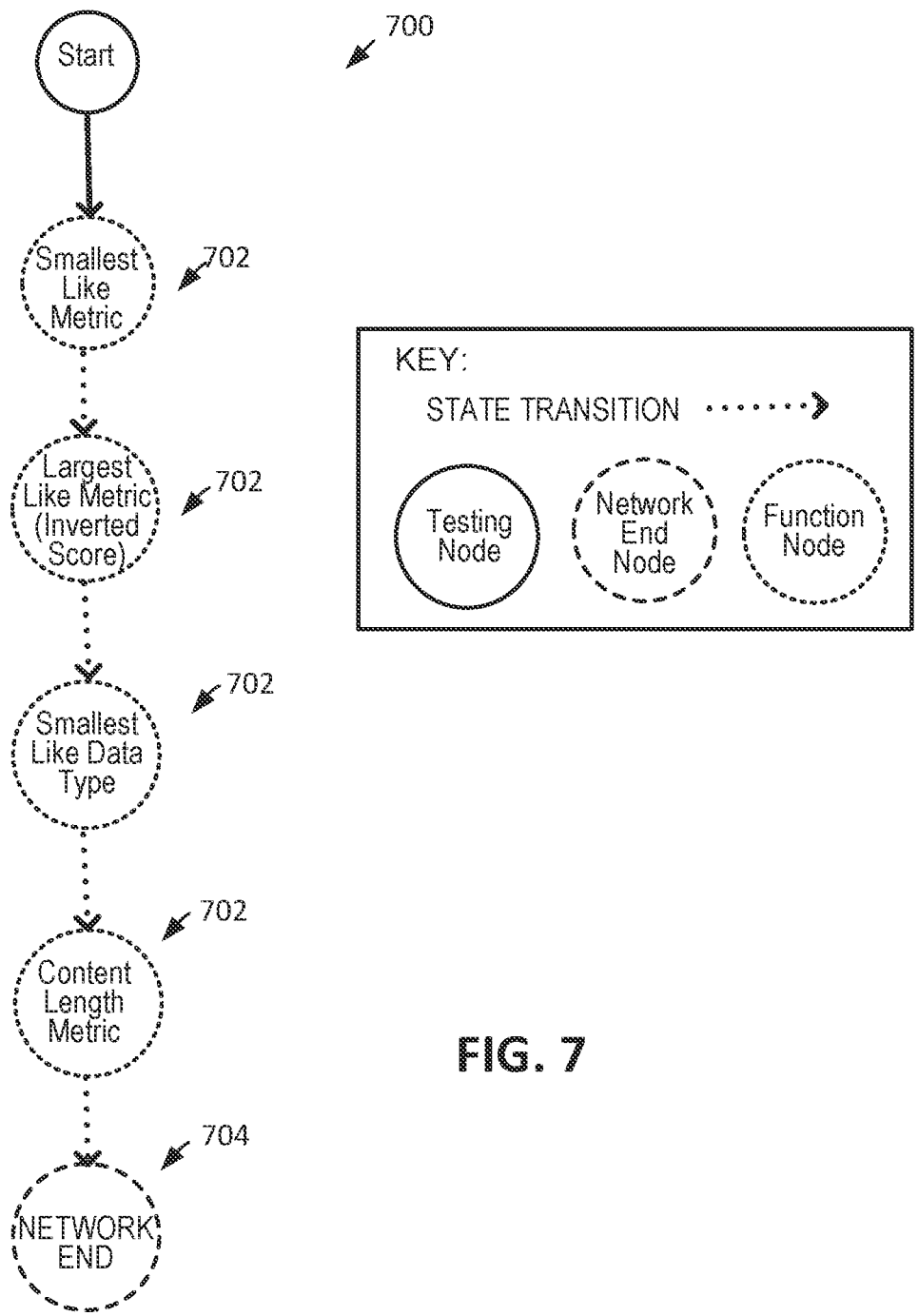
FIG. 7 is a schematic diagram of an example append column node network.

FIG. 7 is a schematic diagram of an example append column node network. Given a single column within a contiguous rectangular selection on an Excel worksheet, an append column node network returns a Statistics Aggregator with an integer categorization type whose highest evaluation score represents the row index of the cell that has been identified as the most representative of the append data within the column. The append column node network operates in a similar manner to the detail column node network described with reference to FIG. 6. The append column node network includes function nodes 702 which (as previously described) compute an evaluation score that is representative of fitness for a particular condition or application. Each node has a pass threshold, e.g., a decimal value between 0.0 and 1.0 that represents the minimum evaluation score to categorize a formula result. The result transitions via one or more state transition until a network end node 704 is reached. Some example evaluation node types used in the append column evaluation node network 700 are described in Table 4.

TABLE 4

| Node Name | Function Description |
| --- | --- |
| Smallest Like Metric | Calculates an evaluation score based on the number of cells in a selection that differ from the least frequently occurring set of font metrics in that selection. Dynamically weights row index integers as its categorization types with the lowest (closest to zero) receiving the highest weights. |

TABLE 4-continued

| Node Name | Function Description |
|---|---|
| Largest Like Metric (Inverted Score) | Calculates an evaluation score based on the number of cells in a selection that differ from the most frequently occurring set of font metrics in that selection. Dynamically weights row index integers as its categorization types with the lowest (closest to zero) receiving the highest weights. The evaluation score is subtracted from 1 to create an inverse score. |
| Smallest Like Data Type | Calculates an evaluation score based on the number of cells in a selection that differ from the least frequently occurring data type in that selection. Dynamically weights row index integers as its categorization types with the lowest (closest to zero) receiving the highest weights. |
| Content Length Metric | Calculates an evaluation score based on an individual cell's text content length variance from the standard deviation of all text content lengths (in characters) in a column selection. Dynamically weights row index integers as its categorization types with the lowest (closest to zero) receiving the highest weights. |

Figure 8:
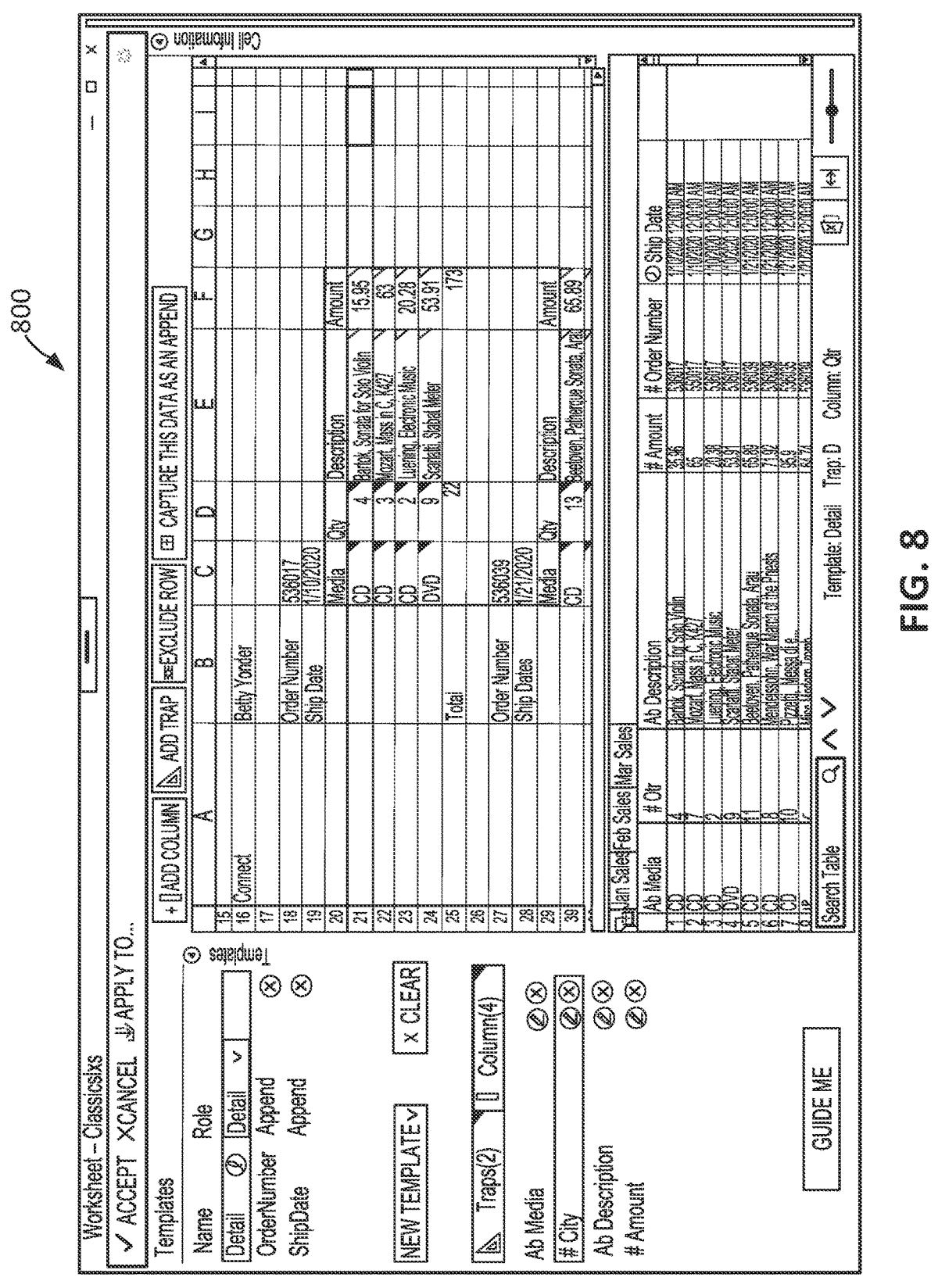

FIG. 8 is a schematic diagram of an example user interface 800 of a computing system within which the data extraction algorithm is executing. The bottom right portion of each screenshot shows the standardized output table (in this case, a one-dimensional table) that consolidates the data from the different tables included a structured data file, for example a spreadsheet.

In some implementations, the user interface of the model algorithm can be configured to provide controls that enable user modification of the inferences drawn by the algorithm about the data in the spreadsheet, which in turn enables quick modifications to the data to be extracted (without requiring the user/operator to have any programming knowledge).

Figure 9:
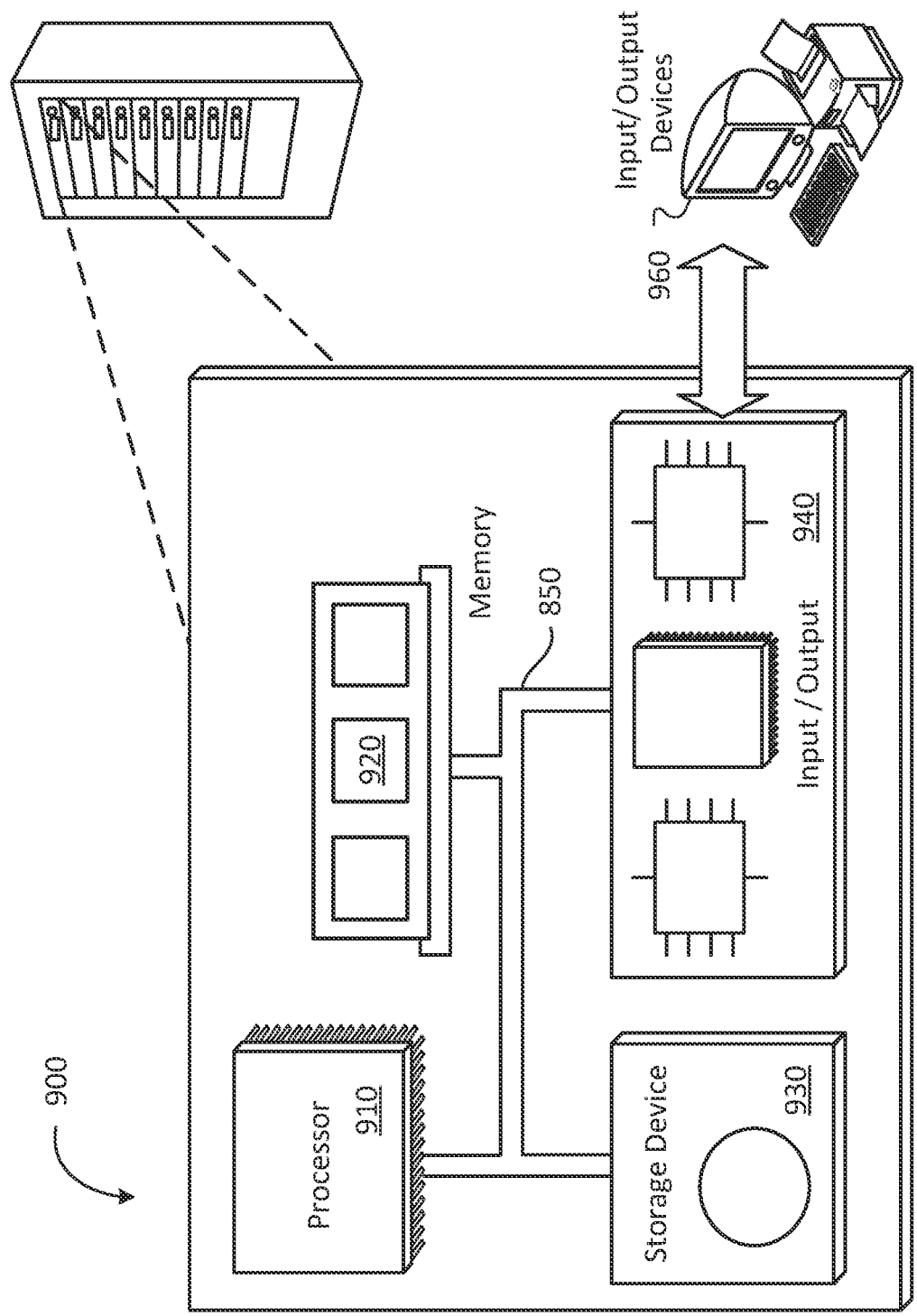
FIG. 9 is a diagram of an example computer system.

FIG. 9 shows an example computer system 900. Computer system 900 may be used to implement, at least in part, data extraction platform 150. Process 700 can be performed at least in part, using the computer system 900. Computer system 900 includes a processor 910, a memory 920, a storage device 930 and an input/output device 940. Each of the components 910, 920, 930 and 940 can be interconnected, for example, by a system bus 950. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 900. In some implementations, the input/output device 840 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 960. In some implementations, mobile computing devices, mobile communication devices, and other devices can be used.

Embodiments of the subject matter and the operations described in this specification (including the accompany appendices) can be implemented in digital electronic circuitry, in tangibly-embodied computer software or firmware, in computer hardware, including the structures disclosed in this specification and their structural equivalents, or in combinations of one or more of them. Embodiments of the subject matter described in this specification (including the accompany appendices) can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification (including the accompany appendices), the different functions can be implemented using "engines," which broadly refer to software-based systems, subsystems, or processes that are programmed to perform one or more specific functions. Generally, an engine is implemented as one or more software modules or components, installed on one or more computers, in one or more locations. In some cases, one or more computers can be dedicated to a particular engine; in other cases, multiple engines can be installed and running on the same computer or computers.

The processes and logic flows described in this specification (including the accompany appendices) can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification (which includes Appendices A and B) can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing models described in this specification (including the accompany appendices) can also include, for example, special-purpose hardware accelerator units for processing common and compute-intensive parts of machine learning training or production, i.e., inference, workloads. Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification (including the accompany appendices) can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification (including the accompany appendices) contain many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described in this specification (including the accompany appendices). Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method for automatically extracting data from a spreadsheet that defines rows and columns and comprises a plurality of cells that are delineated by the rows and the columns, the method comprising:
   obtaining the spreadsheet, wherein the spreadsheet includes data that is stored in a set of rows and a set of columns of the spreadsheet;
   receiving a contiguous selection of cells of the spreadsheet, wherein the contiguous selection of cells spans a first set of rows and a first set of columns, and wherein the first set of rows is a subset of the set of rows and the first set of columns is a subset of the set of columns;
   for each column in the first set of columns:
      identifying characteristics of data included in each cell of the column;
      determining a template type of the column based on the characteristics of the data in each selected cell of the column, wherein the template type includes a categorical template or a detailed record template, and wherein (1) a categorical template specifies that data stored in the column includes categorical data that is associated with a plurality of rows of data in an extracted dataset or (2) a detailed record template specifies that data stored in the column includes detailed data that is associated with a single row of data in the extracted dataset; and
      determining, from among a plurality of cells of the column and based on characteristics of the data included in the plurality of cells of the column, a representative cell that is representative of the determined template type of the column;
   selecting, from among the first set of columns, a second set of columns that includes each column that is determined to be categorical template columns and a third set of columns that includes one or more columns that are determined to be detailed record template columns, wherein identifying the third set of columns that includes one or more columns that are determined to be detailed record template columns, comprises:
      determining a candidacy fitness score for each column in the first set of columns, wherein the candidacy fitness score for a particular column specifies a likelihood of the particular column being suitable for data extraction; and
      identifying, from among the first set of columns, the one or more columns based on the candidacy fitness score for each of the one or more columns being higher relative to the candidacy fitness score for each of a remaining number of columns in the first set of columns;
   identifying, based on the representative cells in each of the first set of columns, a single row in the contiguous selection, wherein each of a plurality of cells in the single row includes data in a format and a structure that is representative of a format and a structure of data stored in a corresponding column for the cell;
   generating, for each column in the third set of columns corresponding to the single row, a set of rules that define data extraction locations in the column;
   generating, based on the single row, the second set of columns, the third set of columns, and the set of rules for each of the third set of columns, an extracted dataset; and
   generating a graphical user interface providing the extracted dataset for display on a computing device, wherein the graphical user interface comprises:
      a first user interface element graphically representing the spreadsheet,
      a second user interface element graphically representing the extracted dataset as a table, and
      a third user interface element comprising one or more controls for modifying one or more inferences regarding the data in the spreadsheet used to generate the extracted data,
   wherein the first user interface element, second user interface element, and third interface element are displayed concurrently in the graphical user interface, and
   wherein generating the graphical user interface comprises modifying the extracted dataset and the second user interface element based on one or more user inputs with respect to the third user interface element.

2. The computer implemented method of claim 1, wherein the candidacy fitness score for each column in the first set of columns is determined based on:
   whether the column includes numeric data, text data, or data identifying dates; and
   whether the column is sparsely populated, wherein a column is sparsely populated if a threshold number of cells of the column are blank.

3. The computer implemented method of claim 1, wherein the characteristics of data in each selected cell of the column includes one or more of:
   a type of the data that specifies whether the data is a text, a number, a currency, or a date;
   border characteristics of the cell including the data;
   color or shading characteristics of the cell including the data;
   font characteristics of the data; and
   alignment characteristics of the data within the cell.

4. The computer implemented method of claim 1, wherein determining a representative cell that is representative of the determined template type of the column, comprises:
   for each of the plurality of cells in the column:
      computing a score for a set of metrics, including a largest like metric, a smallest like metric, a smallest like background metric, a largest like data type, and a content length metric;
      determining a weighted score for each metric in the set of metrics by combining a weight assigned to the metric with the computed score for the metric; and
      combining the weighted score each metric to obtain a combined weighted score for the cell; and
   determining that the combined weighted score for the representative cell exceeds the combined weighted score for each of a remaining cells in the plurality of cells.

5. The method of claim 4 wherein when the combined weighted score for the representative cell exceeds the combined weighted score for each of the remaining cells in the plurality of cells the representative cell is associated with a trap comprising set of rules that define data extraction locations in the column.

6. The method of claim 1, wherein determining a template type of each column comprises constructing a column template evaluation node network, wherein the column template evaluation node network comprises one or more evaluation nodes, wherein the one or more evaluation nodes are selected from:
   testing nodes arranged to evaluate a binary pass/fail condition; and,
   function nodes which compute the candidacy fitness score.

7. The method of claim 6, wherein each node has a pass threshold representing the minimum evaluation score to categorize a formula result.

8. A system, for automatically extracting data from a spreadsheet that defines rows and columns and comprises a plurality of cells that are delineated by the rows and the columns, the system comprising:
   one or more processors; and
   a non-transitory computer-readable media device coupled to the one or more processors and having instructions stored thereon which, when executed by the one or more processors, cause the one or more processors to perform operations comprising:
   obtaining the spreadsheet, wherein the spreadsheet includes data that is stored in a set of rows and a set of columns of the spreadsheet;
   receiving a contiguous selection of cells of the spreadsheet, wherein the contiguous selection of cells spans a first set of rows and a first set of columns, and wherein the first set of rows is a subset of the set of rows and the first set of columns is a subset of the set of columns;
   for each column in the first set of columns:
   identifying characteristics of data included in each cell of the column;
   determining a template type of the column based on the characteristics of the data in each selected cell of the column, wherein the template type includes a categorical template or a detailed record template, and wherein (1) a categorical template specifies that data stored in the column includes categorical data that is associated with a plurality of rows of data in an extracted dataset or (2) a detailed record template specifies that data stored in the column includes detailed data that is associated with a single row of data in the extracted dataset; and
   determining, from among a plurality of cells of the column and based on characteristics of the data included in the plurality of cells of the column, a representative cell that is representative of the determined template type of the column;
   selecting, from among the first set of columns, a second set of columns that includes each column that is determined to be categorical template columns and a third set of columns that includes one or more columns that are determined to be detailed record template columns,
      wherein identifying the third set of columns that includes one or more columns that are determined to be detailed record template columns, comprises:
         determining a candidacy fitness score for each column in the first set of columns, wherein the candidacy fitness score for a particular column specifies a likelihood of the particular column being suitable for data extraction; and
         identifying, from among the first set of columns, the one or more columns based on the candidacy fitness score for each of the one or more columns being higher relative to the candidacy fitness score for each of a remaining number of columns in the first set of columns;
   identifying, based on the representative cells in each of the first set of columns, a single row in the contiguous selection, wherein each of a plurality of cells in the single row includes data in a format and a structure that is representative of a format and a structure of data stored in a corresponding column for the cell;
   generating, for each column in the third set of columns corresponding to the single row, a set of rules that define data extraction locations in the column;
   generating, based on the single row, the second set of columns, the third set of columns, and the set of rules for each of the third set of columns, an extracted dataset; and
   generating a graphical user interface providing the extracted dataset for display on a computing device, wherein the graphical user interface comprises:
      a first user interface element graphically representing the spreadsheet,
      a second user interface element graphically representing the extracted dataset as a table, and
      a third user interface element comprising one or more controls for modifying one or more inferences regarding the data in the spreadsheet used to generate the extracted data,
      wherein the first user interface element, second user interface element, and third interface element are displayed concurrently in the graphical user interface, and
      wherein generating the graphical user interface comprises modifying the extracted dataset and the second user interface element based on one or more user inputs with respect to the third user interface element.

9. The system of claim 8, wherein the candidacy fitness score for each column in the first set of columns is determined based on:
   whether the column includes numeric data, text data, or data identifying dates; and
   whether the column is sparsely populated, wherein a column is sparsely populated if a threshold number of cells of the column are blank.

10. The system of claim 8 wherein the characteristics of data in each selected cell of the column includes one or more of:
    a type of the data that specifies whether the data is a text, a number, a currency, or a date;
    border characteristics of the cell including the data;
    color or shading characteristics of the cell including the data;
    font characteristics of the data; and
    alignment characteristics of the data within the cell.

11. The system of claim 8, wherein determining a representative cell that is representative of the determined template type of the column, comprises:
    for each of the plurality of cells in the column:
       computing a score for a set of metrics, including a largest like metric, a smallest like metric, a smallest like background metric, a largest like data type, and a content length metric;

determining a weighted score for each metric in the set of metrics by combining a weight assigned to the metric with the computed score for the metric; and combining the weighted score each metric to obtain a combined weighted score for the cell; and determining that the combined weighted score for the representative cell exceeds the combined weighted score for each of a remaining cells in the plurality of cells.

12. The system of claim 8, wherein determining a template type of each column comprises constructing a column template evaluation node network, wherein the column template evaluation node network comprises one or more evaluation nodes, wherein the one or more evaluation nodes are selected from:

testing nodes arranged to evaluate a binary pass/fail condition; and, function nodes which compute the candidacy fitness score.

13. One or more non-transitory computer-readable media coupled to one or more processors and having instructions stored thereon which, when executed by the one or more processors, cause the one or more processors to perform operations for automatically extracting data from a spreadsheet that defines rows and columns and comprises a plurality of cells that are delineated by the rows and the columns, the operations comprising:

obtaining the spreadsheet, wherein the spreadsheet includes data that is stored in a set of rows and a set of columns of the spreadsheet;

receiving a contiguous selection of cells of the spreadsheet, wherein the contiguous selection of cells spans a first set of rows and a first set of columns, and wherein the first set of rows is a subset of the set of rows and the first set of columns is a subset of the set of columns;

for each column in the first set of columns:

identifying characteristics of data included in each cell of the column;

determining a template type of the column based on the characteristics of the data in each selected cell of the column, wherein the template type includes a categorical template or a detailed record template, and wherein (1) a categorical template specifies that data stored in the column includes categorical data that is associated with a plurality of rows of data in an extracted dataset or (2) a detailed record template specifies that data stored in the column includes detailed data that is associated with a single row of data in the extracted dataset; and determining, from among a plurality of cells of the column and based on characteristics of the data included in the plurality of cells of the column, a representative cell that is representative of the determined template type of the column;

selecting, from among the first set of columns, a second set of columns that includes each column that is determined to be categorical template columns and a third set of columns that includes one or more columns that are determined to be detailed record template columns, wherein identifying the third set of columns that includes one or more columns that are determined to be detailed record template columns, comprises:

determining a candidacy fitness score for each column in the first set of columns, wherein the candidacy fitness score for a particular column specifies a likelihood of the particular column being suitable for data extraction; and identifying, from among the first set of columns, the one or more columns based on the candidacy fitness score for each of the one or more columns being higher relative to the candidacy fitness score for each of a remaining number of columns in the first set of columns;

identifying, based on the representative cells in each of the first set of columns, a single row in the contiguous selection, wherein each of a plurality of cells in the single row includes data in a format and a structure that is representative of a format and a structure of data stored in a corresponding column for the cell;

generating, for each column in the third set of columns corresponding to the single row, a set of rules that define data extraction locations in the column;

generating, based on the single row, the second set of columns, the third set of columns, and the set of rules for each of the third set of columns, an extracted dataset; and generating a graphical user interface providing the extracted dataset for display on a computing device, wherein the graphical user interface comprises:

a first user interface element graphically representing the spreadsheet, a second user interface element graphically representing the extracted dataset as a table, and a third user interface element comprising one or more controls for modifying one or more inferences regarding the data in the spreadsheet used to generate the extracted data, wherein the first user interface element, second user interface element, and third interface element are displayed concurrently in the graphical user interface, and wherein generating the graphical user interface comprises modifying the extracted dataset and the second user interface element based on one or more user inputs with respect to the third user interface element.

14. The one or more non-transitory computer-readable media of claim 13, wherein the candidacy fitness score for each column in the first set of columns is determined based on:

whether the column includes numeric data, text data, or data identifying dates; and whether the column is sparsely populated, wherein a column is sparsely populated if a threshold number of cells of the column are blank.

15. The one or more non-transitory computer-readable media of claim 13, wherein the characteristics of data in each selected cell of the column includes one or more of:

a type of the data that specifies whether the data is a text, a number, a currency, or a date;

border characteristics of the cell including the data;

color or shading characteristics of the cell including the data;

font characteristics of the data; and alignment characteristics of the data within the cell.

16. The one or more non-transitory computer-readable media of claim 13, wherein determining a representative cell that is representative of the determined template type of the column, comprises:

for each of the plurality of cells in the column:

computing a score for a set of metrics, including a largest like metric, a smallest like metric, a smallest like background metric, a largest like data type, and a content length metric;

determining a weighted score for each metric in the set of metrics by combining a weight assigned to the metric with the computed score for the metric; and combining the weighted score each metric to obtain a combined weighted score for the cell; and determining that the combined weighted score for the representative cell exceeds the combined weighted score for each of a remaining cells in the plurality of cells.

* * * * *